United States Patent [19]

Driskell

[11] 3,769,458

[45] Oct. 30, 1973

[54] COLOR ELECTRONIC SYNTHESIZER

[75] Inventor: Carl R. Driskell, Winter Park, Fla.

[73] Assignee: The United States of America as represented by the Secretary of the Navy, Washington, D.C.

[22] Filed: May 23, 1972

[21] Appl. No.: 256,038

[52] U.S. Cl.......... 178/5.2 R, 35/12 N, 178/DIG. 35

[51] Int. Cl. ......... H04n 9/02

[58] Field of Search ......... 178/5.2 R, 5.4 R, 178/DIG. 35; 35/12 N

[56] References Cited

UNITED STATES PATENTS

| | | | |
|---|---|---|---|
| 2,874,212 | 2/1959 | Bechley | 178/5.4 R |
| 3,644,667 | 2/1972 | Shimotsuma et al. | 178/6.8 |
| 2,819,336 | 1/1958 | Herbst | 178/6.8 |
| 3,004,101 | 10/1961 | Jacobs et al. | 178/6.8 |
| 3,229,089 | 1/1966 | Sasao | 250/65 |
| 3,551,589 | 12/1970 | Moskovitz | 178/5.4 R |
| 3,541,233 | 11/1970 | Ayres | 178/5.2 R |

*Primary Examiner*—Robert L. Richardson
*Attorney*—Richard S. Sciascia et al.

[57] ABSTRACT

In a television system used in a training device to synthesize a television display, a color presentation is derived from black and white video signals. A black and white signal is selectively attenuated or amplified in three separate circuits connected to the respective color guns in a color television receiver. Running lights are provided to simulate the appearance of a ship at night. Means are provided to simulate a missile ship.

3 Claims, 3 Drawing Figures

COLOR ELECTRONIC SYNTHESIZER

BACKGROUND OF THE INVENTION

The invention is in the field of television.

In prior art television systems such as those used in the training devices taught in U.S. Pats. Nos. 3,420,953; 3,497,614; and 3,507,990, monochrome television cameras and receivers have been used. While the desirability of color television in these training devices is obvious, the high cost and complexity of color cameras have heretofore impeded the use of color. A more serious problem preventing the use of color in such training devices has been the difficulty of synchronizing the scanning patterns of a plurality of color cameras where the sweep voltages are frequently varied to simulate changes in range of ships. The invention overcomes these problems of the prior art by providing a color display on a TV receiver using monochrome cameras.

SUMMARY OF THE INVENTION

The invention provides a color television display useful in training devices. The color display is achieved using a color television monitor and monochrome cameras. The video output signal of a monochrome camera is divided into three separate channels and applied to the red, blue, and green guns of the color monitor. Variable attenuators or amplifiers in each channel make it possible to adjust the system to generate a colored image on the monitor screen from the monochrome video. Running lights and a missile firing ship are simulated.

DESCRIPTION OF THE PREFERRED EMBODIMENT

Figure 1:
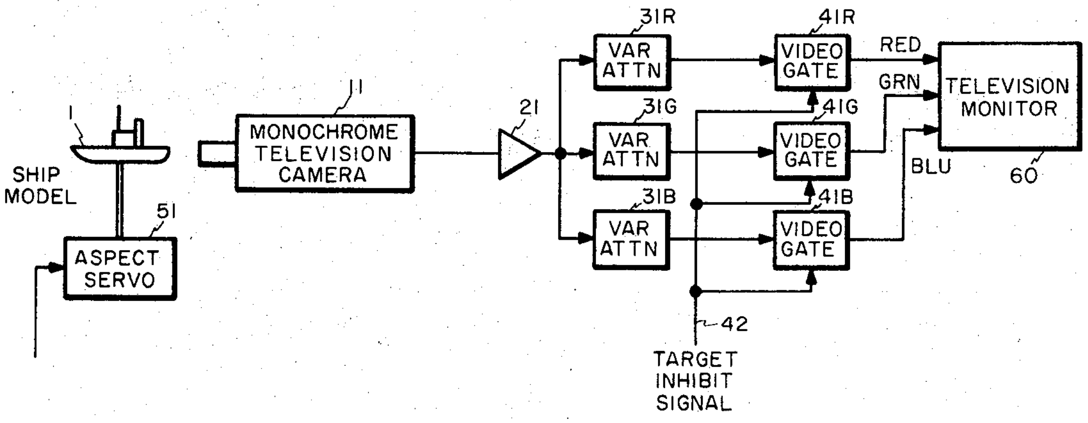
FIG. 1 shows simplified apparatus for deriving a color television display from monochrome video signals.

In FIG. 1 is shown a ship model 1 positioned in the field of view of a monochrome television camera 11. The video output signal of camera 11 is connected through an amplifier 21 and the circuitry shown to a television monitor 60. An aspect servo 51 rotates model 1 in response to commands from apparatus not shown. This arrangement is taught in U.S. Pats. Nos. 3,420,953; 3,497,614; and 3,507,990. These patents disclose a plurality of model ships each surveyed by a respective camera, a background scene (here a seascape) surveyed by a camera, and circuitry for combining the video signals of all the cameras into a combined scene on a television monitor. The arrangement is such that the model ships are caused to maneuver against a seascape background in the combined scene to simulate the view seen from a submarine periscope. The models move about the seascape under the control of an instructor and the entire scene may shift under the control of a student manning the viewing periscope to conform to changing aspects caused by movement of the periscope and/or the submarine housing the periscope.

It has been considered desirable to develop a color television scene wherein the ship models and background are shown in full color. The increased realism inherent in color increases the effectiveness of training devices which simulate a training environment. One problem encountered in converting prior art training devices to color is the high cost and complexity of color cameras and associated circuitry.

Applicant's invention obtains substantially all the benefits of a full color presentation using only a color television monitor and without incurring the expense or control problems of a plurality of color cameras. Applicant uses ordinary monochrome cameras such as camera 11 in FIG. 1, but instead of a monochrome receiver as used in the prior art, monitor 60 is a color monitor. The video output signal from 11 may be amplified in an amplifier 21 and then applied to each of three separate channels connected to the red, blue, and green electron guns of color television monitor 60. Each separate channel contains a variable attenuator such as 31R, 31B, and 31G, each connected in tandem to a respective video gate 41R, 41B, and 41G. Attenuators 31R, 31B, and 31G are individually adjustable to attenuate the video signal by a desired amount. For example, the image of model ship 11 on the screen of monitor 60 can be colored red by sufficiently attenuating the video signal in the blue and green channels by adjustment of attenuators 31B and 31G. The model image can be colored blue by attenuating the video signal in the red and green channels. The model can be colored green in a like manner and various colors can be obtained by selective adjustment of the attenuators to blend the three base colors.

Video gates 41R, 41B, and 41G function to block the video signals to monitor 60 when a "target" inhibit signal is present on a line 42. This signal is obtained from circuits which are not part of this invention. It is required when the periscope operator's view of the ship image is obliterated by an intervening object, e.g., a nearer ship, or the horizon. The horizon may be part of a background scene derived from a camera or a video recorder not shown.

Figure 2:
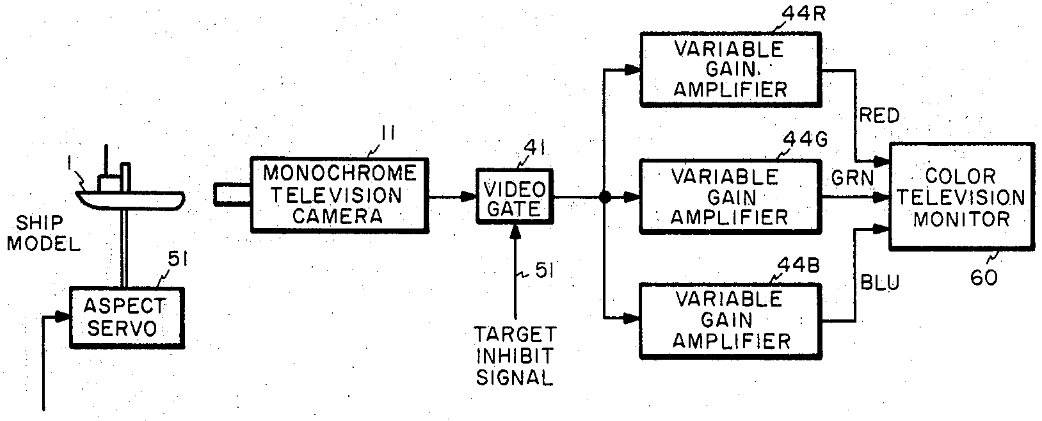
FIG. 2 shows a second apparatus for deriving a color television display from monochrome video signals.

FIG. 2 shows a second embodiment of the invention wherein variable gain amplifiers 44R, 44B, and 44G are substituted in the red, blue, and green channels for the variable attenuators shown in FIG. 1. A single video gate 41 is interposed between the camera 11 and the variable gain amplifiers to provide image blocking.

Figure 3:
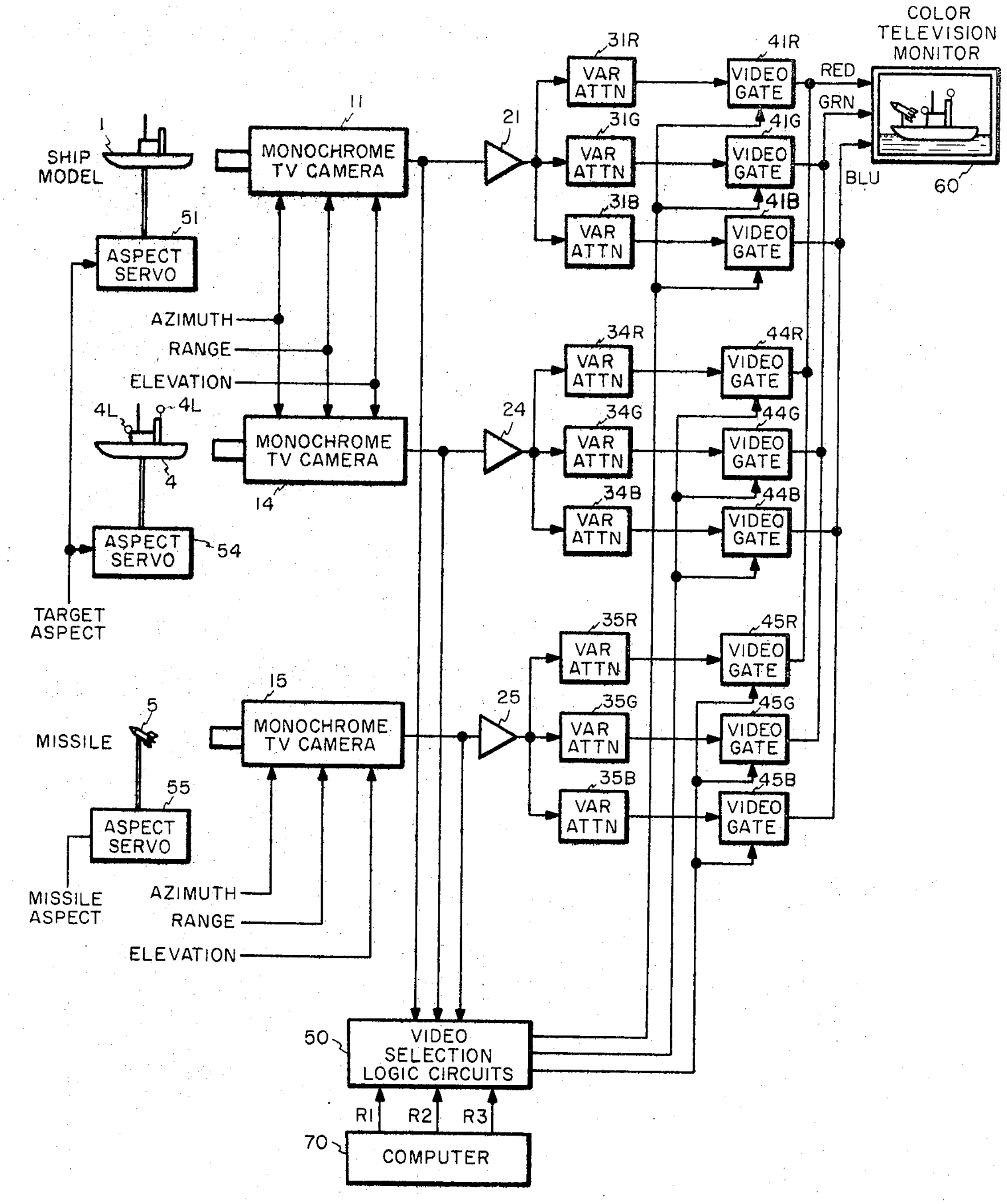
FIG. 3 shows a more complex version of the invention including means for simulating running lights and a missile ship.

FIG. 3 shows the apparatus of FIG. 1 plus apparatus for obtaining a display of running lights and rockets. The top row of elements shown are those of FIG. 1. The second row comprises a second model ship 4 which can be rotated on command by an aspect servo 54 in synchronism with model 1. Model 4 is positioned in the field of view of a monochrome camera 14 and is connected through the attenuators and gates shown to color television monitor 60 in the same manner as camera 11. In a like manner, the bottom row of elements in FIG. 3 comprises a missile model 5 surveyed by a monochrome camera 15 which is connected to monitor 60 in the same manner as cameras 11 and 14. All of the models are positioned in front of a dark non-reflective background which is not shown. Other elements in FIG. 3 are a video selection logic circuit 50 and a computer 70.

Model ship 4 is a flat black color and has several simulated running lights 4L which may comprise small white disks or balls. These are positioned on model 4 in the locations where running lights are normally positioned. Model ship 4 is identical in shape and size with model 1. The video output signals from camera 11 results in an image of model ship 1 on the screen on monitor 60. The video from camera 15 produces an image of missile 5 on the screen. However, the video from camera 14 results in an image of running lights 4L only appearing on the monitor screen. The dark non-reflective surface of model 4 superimposed on a similar background does not register on the camera. Aspect servos 51, 54, and 55 are arranged to move models 1, 4, and 5 in synchronism and the cameras are so positioned that the total image on the monitor screen is that of model ship 1 having running lights 4L and missile 5 mounted thereon. Video selection logic circuit may be operated manually or by computer 70 to control selected ones of nine gates 41R, 41B, 41G, 44R, 45B, etc., and although no connections are shown in FIG. 3, computer 70 can be connected to selectively control the nine variable attenuators 31R, 31B, 31G, 34R, 35B, etc.

The apparatus of FIG. 3 when used in a training device makes it possible to simulate both daytime and nighttime operations in a training device. During simulation of daytime operations a picture such as shown on monitor 60 can be observed. To simulate nighttime operations the video signals from cameras 11 and 15 are blocked by operation of the video selection logic circuit 50. This may be done manually or ordered by computer 70. Since only the video from camera 14 would reach monitor 60, the view on the monitor screen would consist of running lights 4L only. Variable attenuators 34R, 34B, or 34G may be controlled to give the running lights visible on 60 a selected color. If gates 44B and 44G are closed, running lights 4L will appear red on the monitor screen. If gates 44R and 44B are closed, the lights will appear green.

It should be understood that in a practical training device a complex mechanism such as is taught in the aforementioned patents will be interposed in the circuit of FIG. 3 between the gates and the monitor. This mechanism makes it possible to show several ships, planes, etc. maneuvering against a marine background scene. For example, a selected ship image may be caused to traverse the monitor screen or to move into or out of the picture towards or away from the horizon. A realistic motion can be imparted to the image of rocket 5 on the monitor screen to simulate rocket firing. The invention greatly increases the effectiveness of the described training devices by making it possible to show model images or lights on the monitor screen in any selected colors.

What is claimed is:

1. In a television system using a monochrome television camera to generate video information and a color television monitor for displaying said video information, the improvement comprising:

connecting means connecting said camera to said monitor for transmitting said video information from said camera to said monitor, said connecting means comprising three separate channels, each of said channels comprising a variable attenuator for selectively attenuating said video information in a respective channel and a video gate for selectively inhibiting said video information in said respective channel, the output of said camera being connected to each of said channels, the output of each of said channels being connected to a respective one of the red, green, and blue electron guns in the picture tube of said color television monitor, whereby said video signal may be displayed on said monitor in colors determined by the selected adjustments of said variable attenuators.

2. The apparatus of claim 1, and including:

a first model having a realistic appearance, a first monochrome camera, said first model being positioned in the field of view of said first camera, a second model having a dark non-reflective finish, a second monochrome camera, said second model being positioned in the field of view of said second camera, a plurality of simulated lights having a lighter appearance affixed to said second model, said first camera and said second camera each being connected to said monitor by respective connecting means such as described in claim 1, and video selection logic circuits for controlling said video gates to display an image of said first model on said monitor to simulate a daytime scene and to display an image of said simulated lights on said monitor to simulate a nighttime scene.

3. The apparatus of claim 2, and including:

a missile model, a third monochrome camera, said missile model being positioned in the field of view of said third camera, said third camera being connected to said monitor by connecting means such as described in claim 1, said video selection circuits being connected to control said video gates to display said missile on said monitor.

* * * * *